April 24, 1956     F. C. HULL ET AL     2,743,199
PROCESS OF ZONE REFINING AN ELONGATED BODY OF METAL
Filed March 30, 1955
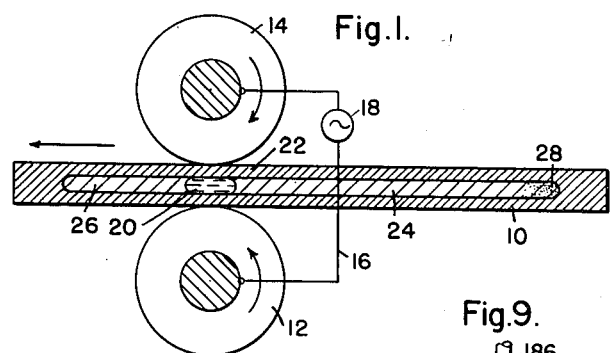
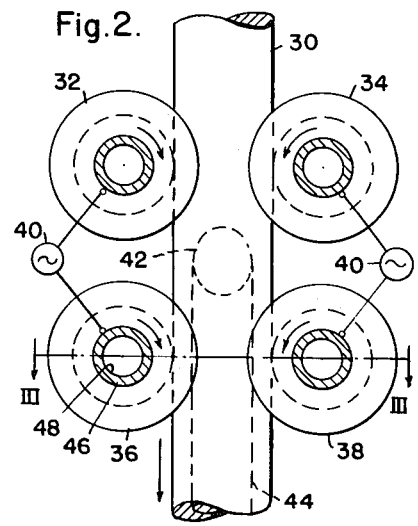
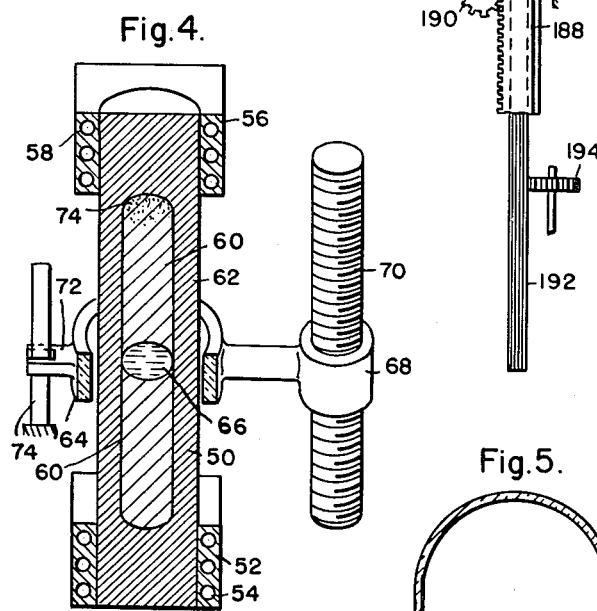
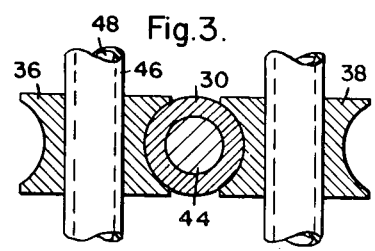
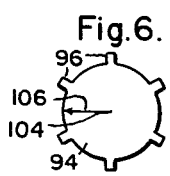
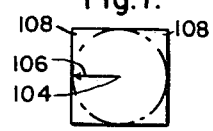
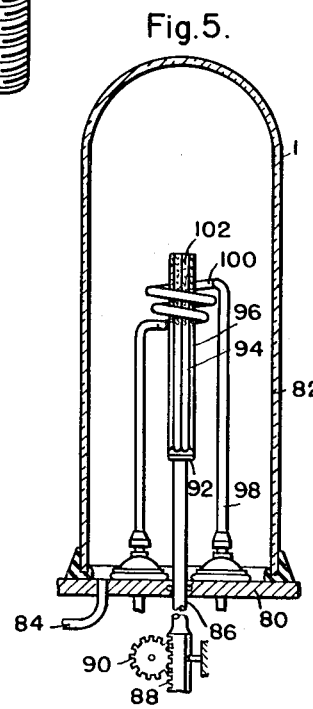
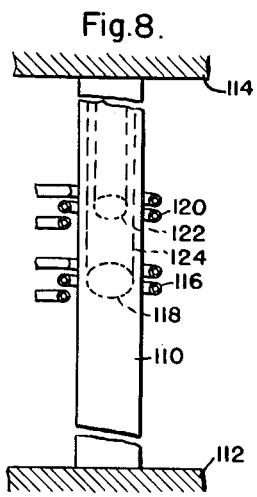
WITNESSES:
E. A. McCloskey
Wm. B. Sellers
INVENTORS
Frederick C. Hull, Porter H. Brace,
George Comenetz & Alexander W. Cochardt
BY
Frederick H*****
ATTORNEY United States Patent Office 2,743,199
Patented Apr. 24, 1956

2,743,199

PROCESS OF ZONE REFINING AN ELONGATED BODY OF METAL

Frederick C. Hull, Penn Township, Allegheny County, Porter H. Brace and George Comenetz, Forest Hills, and Alexander W. Cochardt, Wilkins Township, Allegheny County, Pa., assignors to Westinghouse Electric Corporation, East Pittsburgh, Pa., a corporation of Pennsylvania Application March 30, 1955, Serial No. 498,069

13 Claims. (Cl. 148—1)

This invention relates to zone refining and, in particular, to processes for zone refining metals.

It is well known at the present time how to zone refine metals by disposing them within a boat or other receptacle of refractory material and passing the boat with the metal slowly through an induction coil which melts a narrow section of the metal. A problem with many metals being so zone refined resides in the fact that the molten metal is in contact with the refractory boat material, such as a ceramic, graphite, or a metal, and will become contaminated thereby. Some metals are extremely reactive in the molten state and will react with or dissolve almost any known material that may be used as a refractory receptacle to confine the molten metal. Particles of the refractory receptacle are sometimes mechanically entrapped in the melt and form undesirable inclusions.

A further problem resides in the fact that zone refining, as practiced heretofore, has been applied to relatively small bodies of metal. Ordinarily, a body of metal being zone refined in accordance with present-day practices does not exceed about 1 inch in diameter and often is smaller than this. For many purposes, it is desirable that metal bodies being zone refined be of a substantial diameter of the order of 2 inches to 6 inches in diameter, or other similar cross-sectional dimension if they are not circular. No known process is satisfactory in handling relatively large masses of metal of such dimensions.

The object of this invention is to provide for zone refining elongated bodies of metals without subjecting any of the metal melted during the process to contact with a foreign body.

Another object of this invention is to provide a process for zone refining an elongated body of a metal in such manner that only the interior portion of the elongated body is molten and subjected to zone refining, while the exterior portions of the body are unmelted and serve to confine the molten metal during the process.

A further object of this invention is to provide a cage, zone-refining process wherein elongated bodies of metal having a non-circular cross section are caused to melt at the interior, while exterior portions of the body form an apertured cage serving to retain the molten metal during the process.

Other objects of the invention will, in part, be obvious and will, in part, appear hereinafter.

For a better understanding of the nature and objects of the invention, reference should be had to the following detailed description and drawing, in which:

Figure 1 is a vertical section through a bar being zone refined;

Fig. 2 is a plan view of another form of zone-refining procedure;

Fig. 3 is a cross section on line III—III of Fig. 2;

Fig. 4 is a vertical cross section through another modification of a zone-refining procedure;

Fig. 5 is a vertical cross section through a cage zone-refining apparatus;

Fig. 6 is an end view of the zone-refined member of Fig. 5;

Fig. 7 is an end view of a modified form of a member being zone refined;

Fig. 8 is an elevation partly in section of a still further form of apparatus for zone refining in accordance with the invention; and Fig. 9 is a fragmentary vertical view of a mechanism.

The zone-refining processes of the present invention may be applied to various metals. The term "metal," as used herein, is intended to apply to any metal, metalloid, such as silicon and germanium, and metallic alloys of special types. Examples of metals that may be zone refined in accordance with the invention are titanium, zirconium, molybdenum, uranium, chromium, iron, and vanadium. The term "impurity" designates any minor component which it is desired to remove or segregate from the main body of the metal.

The process of zone refining a metal has for its object the concentration and segregation of impurities. If $C_s$ is the solubility of an impurity in the solid and $C_1$ is the solubility in the liquid, the ratio of these solubilities defines a distribution coefficient $$K = \frac{C_s}{C_1}$$

which is useful in describing zone-refining processes. For most impurities K is less than 1, and the impurities are concentrated in the liquid and displaced towards the finishing end of the member being zone refined. If K is greater than 1, the impurity is more soluble in the solid and is concentrated at the starting end of the bar. Both types of impurities may, of course, be present in a given material. The farther K departs from 1, either larger or smaller, the more effective is the purification per pass and the lower is the limiting distribution. In the following description we speak only of the case where K is less than 1, but it is to be understood that we are not excluding the case of K greater than 1, or a combination of both. These can be handled by appropriate sectioning of the refined bar and discarding of the ends wherein the impurities are segregated.

Small quantities of impurities of the order of less than 0.1% may be reduced to a vanishing fraction of a per cent by zone refining a given elongated body of the metal 5 or 6 times. However, the zone-refining process may be applied only once or twice or may be repeated 10 times and more, as necessary. In many cases, certain alloying ingredients present in appreciable amounts with K values close to 1 may be reduced slightly by several zone-refining passes, but they will not be reduced as much as are impurities whose K values are generally much smaller than 1.

It will be understood that the zone-refining process tends to segregate and concentrate the impurities at one end or the other of the elongated body depending on whether K is greater or less than 1. Consequently, at the conclusion of the zone-refining process, the end or ends of the body in which the impurities have been concentrated will be removed or separated from the main zone-refined metal body.

Briefly, our invention comprises the heating of the elongated body of metal to be zone refined by applying an electrical current to the elongated body in such manner that the electrical current reaches a current density sufficiently great at a given transverse cross section of the elongated body such that the interior at that cross section is heated thereby above the melting point of the metal, while the exterior portion of the body is unmelted because of heat losses by radiation and cooling, and the solid exterior constitutes a confining, supporting, and protecting enclosure for the molten metal at the interior. The heating is then progressively varied, usually by varying the position of application of the electrical current, so that the molten zone at the interior of the elongated body is progressively moved to melt more of the interior of the body at one end of the molten zone. At the opposite end of the molten zone, the metal solidifies from the melt. In effect, the molten zone moves progressively along the interior of the molten body. In its passage through the interior of the elongated body, the molten zone picks up and retains impurities that are more soluble in the molten metal than they are soluble in the solid metal. A single pass of the molten zone through the elongated body consequently produces an interior that is purified, with respect to the original amounts of the components that are more soluble in the molten phase. Toward one end of the elongated body, however, there will be a small interior portion which solidifies last and consequently contains the concentrated impurities.

The zone-refining process may be repeated, beginning with the end of the elongated body farthest away from the last solidified portion of the previous zone-refining operation. In this second traversal of the molten zone through the interior of the elongated body, the impurities are again reduced in amount. Repetition of the zone-refining process will enable the interior portion of the elongated body to be purified to a degree which is greater, the farther K is from one, until a calculable limiting distribution is obtained. In the case of commercially purified silicon and germanium, for example, after 5 to 10 zone-refining passes, the metal may reach such a purity that there will be less than 1 part of impurity per 1000,000,000 parts of either silicon or germanium.

After the zone-refining process has been carried out to produce the desired degree of purification of the interior of the elongated member, the member may then be subjected to machining or other process for removing the exterior portions of the body which were not subjected to the zone-refining operation. The interior portion containing the concentrated impurities deposited therein by the last solified molten zone metal ordinarily will also be removed from the rest of the member. The resulting remaining bar of zone-refined metal will be suitable for numerous uses and applications for which its improved composition renders it exceptionally desirable.

We employ the unmolten exterior portion of the elongated body being zone refined as a confining or retaining means for the molten metal. An important function, however, of the solid exterior portion of the elongated member is that it serves to prevent a reaction between the molten metal with a foreign crucible material which is particularly likely to occur with highly reactive metals, such as for example as titanium, silicon, zirconium, and uranium. A further field of application is for the melting and purification of metals of extremely high melting point, such as molybdenum and tungsten for which no known ceramic crucibles are suitable. It is well known by those skilled in the art that one of the major problems in producing bodies of these reactive metals is the prevention of contamination of these metals in the molten state by any contacting solid or even a gas atmosphere. These metals will react with and absorb oxygen, nitrogen, water and other constituents of the air; hydrogen often is dissolved in and readily reacts with these metals. Traces of impurities in any inert gas atmosphere will be absorbed readily by these metals. Consequently, the usual gas atmospheres commercially available are not satisfactory for contact with these metals in the molten state. In a modification of our process, the solid exterior metal functions to shield the molten metal from whatever gas may be present around the members during the zone-refining process. Consequently, the process may be carried out in many cases in the ordinary atmosphere or, at most, in a blanket of a commercially available and inexpensive gas which need not be of any extraordinary purity.

Referring to Fig. 1 of the drawing, there is illustrated one modification for carrying out the zone-refining process of the invention wherein resistance heating procedures are employed. The elongated body 10 of the metal being zone refined is passed to the left between contact rollers 12 and 14 connected by wiring 16 to a source 18 of electrical current. Sufficient electrical current is passed between the rollers 12 and 14 to heat the interior of the bar, so that at the cross section of the elongated bar directly between the contacting portions of the rollers 12 and 14 there is produced a temperature high enough to melt the interior portion of the body, thereby producing a molten zone 20. Only sufficient electrical current is employed to insure melting the interior portion 20 alone, while the exterior surface of the member is cooled by radiation, or by applying blasts of air or gases thereagainst or even, in some cases, by applying chill means, such as water-cooled shoes or water-cooled current contact rollers in order to maintain the temperature of such exterior surfaces substantially below the melting point of the metal. As the elongated body 10 moves to the left, the electrical current causes the interior portion at the right-hand end of the molten zone 20 to melt, while the left-hand end of molten zone 20 solidifies producing a central core 26 of purified metal. Impurities segregate in the molten zone 20 to an extent that depends upon their segregation coefficients. Consequently, as the elongated member is slowly and progressively moved to the left, the molten zone 20 will become richer and richer in impurities. Finally, at a point 28 near the right-hand end of the body 10, the current supply to the rollers 12 and 14 may be terminated, thereby permitting the molten zone to solidify. This portion at 28 will be high in the impurities concentrated during the zone-refining passage. The elongated body 10 may then be subjected to repeated zone refining by introducing the left-hand end of the body 10 between the contact rollers 12 and 14 and applying electrical current thereto and continuing the operation. After a predetermined number of passes, the central core portion 24 will have been purified to the desired degree. The body 10 may then be machined to remove the exterior portions 22, as well as the two ends and the portion 28 in which the impurities have been concentrated. This will produce a zone refined, highly purified member comprising the core portion 24.

It will be understood that several sets of contact members, such as rollers 12 and 14, may be applied to the elongated body 10 in order to carry out simultaneously a series of zone-refining operations in a single pass of the elongated member between such rollers. Also, while rollers 12 and 14 have been shown, it will be appreciated that shoes or other sliding contact members may be employed. Such contact rollers or shoes may comprise copper, silver, and other suitable contact materials. Water cooling may be applied to the rollers 12 and 14 in order to maintain them at a suitable temperature. The electrical current may be alternating current or direct current, as desired.

Furthermore, the elongated body 10 in Fig. 1 may be of a circular, rectangular, hexagonal, or other suitable cross section. More than a single pair of contact members may be employed. In the event that the elongated body 10 is of square cross section, there may be applied at a given transverse cross section two pairs of contact rollers, one pair being in contact with the upper and lower surfaces, while the other pair is in contact with the sides of the square body.

Referring to Fig. 2 of the drawing, there is illustrated a modified form of resistance heating apparatus for carrying out the zone-refining process on a round bar. The elongated body 30 of circular cross section is disposed between a first pair of contact rollers 32 and 34 disposed ahead of another pair of contact rollers 36 and 38. The rollers 32 and 34 are connected to one terminal of a suitable source of electrical current 40, while the contact rollers 36 and 38 are connected to the other terminal of the current source 40. Consequently, the electrical current passes from the contact rollers 32 and 34 into the elongated body 30 and thence travels through the body to the second pair of contact rollers 36 and 38. The flow of electrical current is concentrated in a volume between the rolls and results in heating the interior portion of the body 30 to form a molten zone 42 confined within the solid exterior surface of the body. Normal radiation or gas blasts may be relied upon to keep the exterior solid. As the body 30 traverses downwardly, as shown in Fig. 2 of the drawing, the molten zone 42 moves upwardly to melt more of the interior at its upper end, while purified metal solidifies out at the lower end of the molten zone 42, thereby leaving a purified core 44 in the interior portion of the body 30. The contact rollers 32 and 34, and 36 and 38 are mounted on axles 46 provided with internal conduits 48 for passage of water or other cooling liquid therethrough to cool the contact rollers and prevent them from being adversely affected by the temperature. One advantage of this embodiment of our invention, over that shown in Fig. 1, is that the contact pressure is not applied directly over the molten zone. There is less heating of the contact rollers and the possibility of crushing the body is low.

Referring to Fig. 4 of the drawing, there is illustrated a still further modification of the invention. In this figure, the elongated body 50 is connected at its lower end to an electrical terminal 52 provided with water-cooling conduits 54, while the upper end is connected to a second electrical terminal 56 similarly provided with a water-cooling conduit 58. Electrical current is supplied from a suitable source such as a transformer, battery or a generator, to the terminals 52 and 56 to cause the elongated body 50 to be heated to such an extent that the interior portion adjacent the axis is close to but below the melting point of the metal. Ordinarily the exterior surfaces of the elongated body 50 are cooled by natural radiation or, in some cases, by directing streams of cooling gases thereupon to prevent the exterior surface portions from reaching the melting point.

There is disposed about the elongated body 50 an encircling member 64 comprising a means for increasing the temperature at the cross section of the elongated body encircled thereby. The member 64 may comprise thermal insulating material such, for example, as ceramic or metal radiation shields made of stainless steel, silver, molybdenum, or the like. The purpose of the thermal shielding 64 is to cause a portion of the interior to form a molten zone 66. Alternatively, the member 64 may comprise a heating means such, for example, as a resistance element sufficient to raise its temperature so that the heat thereof will be radiated to the encircled body and will cause melting of the interior of the body without, however, causing melting of the exterior. In some cases, the member 64 may comprise an induction heating coil designed to generate an additional electrical current in a narrow portion of the elongated body which it surrounds sufficient to cause the temperature thereof to rise to the extent sufficient to melt the interior portions. The member 64 is mounted on a bracket 68 threadedly engaged with a rotatable worm 70, and with a bifurcated tongue 72 disposed about a vertical bar 74. By rotating the worm 70, the member 64 may be raised or lowered as desired, the bifurcated tongue 72 serving to maintain the position of the member 64 and serving to guide it.

As shown in Fig. 4, the worm 70 is rotated in such fashion that the member 64 rises slowly, thereby causing the pool 66 to traverse upwardly the interior portion 60 of the member 50. The portion 60 is confined by the exterior surface 62 of the body. When the upper end of the body 50 has been reached by the member 64 the zone 66 is permitted to solidify, leaving a portion 74 containing the concentrated impurities. The member 64 is traversed to the lower end of the body 50, and the zone-refining process repeated as often as desired.

In the modifications of Figs. 1 through 4, the molten zone was substantially completely confined and enclosed by the unmolten exterior surfaces of the elongated body being processed. In some instances, however, it may be desirable to support the molten zone while at the same time exposing small areas thereof for the purposes of degassing or otherwise treating the molten zone metal. Such a process is illustrated in Fig. 5 of the drawing showing a base 80 on which is mounted an enclosure 82 of suitable transparent material, such as glass, or the like, providing a hermetically-sealed chamber. A conduit 84 which may be connected to a vacuum pump, passes through the base and leads to the interior of the chamber defined by the enclosure 82. A vertical movable shaft 86 slidably disposed through a hermetic seal in the base 80 extends within the interior of the chamber. The bottom portion of the shaft 86 is provided with a rack 88 engageable with a gear 90 which may be rotated to raise or lower shaft 86. The upper end of the shaft 86 disposed within the chamber is provided with a pedestal 92 upon which is placed an elongated body 94 provided with exterior ribs 96. The shaft 86 and pedestal 92 may be water cooled. Hollow tubing 98 passing through the base 80 is formed into an induction heating coil 100 encircling a narrow portion of the elongated ribbed body 94. The tubing 98 is water cooled, as is well known. High frequency electrical current, for example 10,000 cycle electrical current, is passed through the induction coil 100, whereby to induce a field in metal body 94 and thereby to heat a narrow zone of the elongated body 94 to melt an interior zone or portion 102 of the body without, however, heating the ribs 96 to the melting point. The ribs 96, consequently, form a cage within which the molten zone 102 is retained and prevented from escaping. By revolving the gear 90, the shaft 86 is moved upwardly thereby causing elongated body 94 to be elevated and the molten zone is caused to progress downwardly. This procedure results in the zone refining of the interior of the body 94 with the exception of the ribs and the upper and lower ends of the body. A single zone-refining pass will produce an improvement in the metal by reason of degassing and purification. The process may be repeated a number of times to secure a suitable degree of purification of the interior of the body.

In some instances a selected gas may be introduced into the chamber within enclosure 82 to deoxidize the molten metal or to produce a desired reaction product or metallic material.

The use of alternating current in the coil 100 will cause stirring of the molten metal, thus improving the efficiency of the process. The use of an induction coil energized with alternating current at member 64 of the modification of Fig. 4 will likewise cause molten metal 66 to be stirred. In our other modifications the use of alternating current will result in stirring or agitation of the molten metal.

Elongated bodies suitable for zone refining in the apparatus of Fig. 5 may comprise any body of non-circular cross section, so that a circle drawn from the center of said cross section to the nearest exterior surface will include interior portions, while portions outside of the circle constitute ribs which will function as a cage for molten metal. As illustrated in Fig. 6, the elongated body 94 of Fig. 5 as seen from one end, or across a transverse section, has a center 104 from which the radius 106 to the nearest exterior surface will generate a circle outside of which are the ribs 96. The ribs constitute a cage to retain the molten metal which will comprise all of the metal within the circle inscribed by the radius 106.

Numerous geometrical shapes are suitable for cage zone refining. For example, a square cross-section elongated body is shown in Fig. 7. The center 104 of the cross section is connected by the radius 106 to the nearest exterior surface. The circle generated by the radius 106 leaves the corners 108 suitable to function as a cage for the molten metal. In practice, we have subjected squareshaped members of titanium, zirconium, and other metals to cage zone refining in apparatus such as shown in Fig. 5 with excellent results.

Thus, a square bar of titanium, approximately 12 inches long, was disposed within an induction coil energized at a frequency of 10,000 cycles. The titanium carried approximately 0.5% of iron as an impurity. After several zone-refining passes in apparatus such as shown in Fig. 5 of the drawing, in an atmosphere of helium, the square bar was machined to remove the unmolten corners. Analyses were made along the length of the bar at points approximately 2 inches apart. The iron content had decreased by 20% along 90% of the titanium bar, while the iron content at the end at which the zone-refining pass is directed was increased considerably. A very definite improvement can be expected for impurities originally present in low proportions and which have low K values, in that they may be removed to trace amounts.

A titanium bar 12 inches long, comprising a cylindrical core portion of a diameter of 1 inch with 10 equally spaced fins disposed about the longitudinal periphery thereof, the fins having a dimension of $1/16$ inch width by $1/8$ inch height, was zone refined in an apparatus similar to that of Fig. 5 in a helium atmosphere, using 10,000 cycle current in the induction coil. A substantial improvement in purity of the cylindrical body was found on analysis after the refining process. The coil employed in zone refining both of the above titanium bars comprised $10\frac{1}{2}$ turns, and it had a coil height of 2.75 inches. A current of 460 amperes was passed through the coil, and the total time to make one refining pass was 37 minutes. The fins or cage bars confined the molten titanium and helped prevent its escape. An additional factor preventing escape was the electromagnetic levitating force of the induction coil current upon the eddy-current carrying melt. Levitation was favored by the inverted conical shape of the induction coil.

Zirconium bars of a cross-section similar to that shown in Fig. 6 were subjected to zone melting in apparatus such as shown in Fig. 5 of the drawing.

In certain cases we have found it to be desirable to provide in the apparatus of Fig. 5 a mechanism for rotating shaft 86 and the metal body 94 thereon about a vertical axis. One such mechanism is illustrated in Fig. 9 of the drawing wherein the shaft 186, corresponding to shaft 86, is provided with a flange 184 so that it rests on and is revolvably mounted in the rack support 188. The gear 190 engages rack 188 and upon being turned will raise or lower the rack support 188 and the shaft 186. The lower end of shaft 186 is provided with splines 192 engageable with a gear 194 which can be revolved and thus revolve shaft 186. This mechanism of Fig. 9 for revolving the shaft 186 assures a uniform heating of the metal body 94 even when the body is not uniformly centered in coil 100 or when the coil is not symmetrical or otherwise heats the metal non-uniformly.

We have also secured improved cage melting results by employing a heat measuring device to regulate the rate of movement of gears 90 and 190 in accordance with the temperature of the molten zone. In such instance we have focussed the heat from the center of the molten zone upon a thermocouple and when the output of the thermocouple indicated a change from a desired temperature the speed of the motor driving gear 90 was changed to speed it up and raise the body 94 faster if the temperature was excessive or slow it down if the temperature was low. The voltage from the thermocouple was introduced into a Wheatstone bridge circuit, and any change in this circuit was amplified and operated a variable voltage control to vary the current to the driving motor attached to gear 90. Highly uniform melting was obtained.

In case the body 94 is of extreme dimensions so that its weight is high or its length so great that the fins 96 may be deformed particularly when the molten zone is at the lower end of body 94, a counterweight or spring may be applied to the upper end of body 94 to take up a substantial part of such weight. In this way the fins 96 will be protected from collapse.

Fig. 8 illustrates the practice of our invention differing from the modification of Fig. 4 by substituting induction heating coils for the resistance contacts 52 and 56. In this case multiple zone-refining passes are applied simultaneously to a given elongated body. The body 110 of the metal to be zone refined is fastened to a lower support 112 and an upper support 114. A first induction heating coil 116 is disposed about the body 110 and energized with electrical current with such magnitude current density that the induced amperage through the center of the induction coil produces a totally-enclosed molten zone 118 disposed within an unmelted outer surface. A second induction coil 120 is disposed slightly above the induction coil 116. The second coil 120 is also energized with an electrical current of a sufficient magnitude and frequency to induce a current density such that the interior portion of the elongated body 110 is melted to produce a molten zone 122. It will be understood that only a single coil 116 may be used, or additional induction coils may be disposed about the body 110, if desired to effect more zone refining passes at one time.

It has been found desirable to apply a slightly greater current to the first induction coil 116 than is applied to the coil 120, so that the molten zone 122 has a slightly smaller cross-sectional area perpendicular to the longitudinal axis of the member 110. The reason for this is that as the coils 116 and 120 pass downwardly, the succeeding molten zone 122 traverses only the previously purified metal at the interior of the body and does not appreciably come in contact with previously unmolten and unpurified metal in the exterior surface. The purified metal solidified from the first zone 118 constitutes a generally cylindrical column 124 which is of slightly larger diameter than the molten zone 122. If additional induction coils are disposed above the coil 120, it will be desirable that they, in turn, have correspondingly smaller molten zones for this reason.

In repeating the processes illustrated in Figs. 1, 2, 4, and 5, it may be desirable for the utmost purification, in repeating the zone-refining process to effect each succeeding pass at a slightly reduced current, so that the diameter of the molten zone is slightly less than the diameter of the molten zone in the previous pass in order to prevent contamination of the succeeding molten zones with previously unpurified metal. In this way, the utmost beneficiation by the zone-refining process is obtained.

In practicing the cage zone-refining process illustrated in Fig. 5, unusual benefits are obtained when the interior within the enclosure 82 is under a high vacuum. The molten metal in the zone which is exposed through the windows of the cage formed by bars 96 will degasify, thereby eliminating such gases as hydrogen, nitrogen, oxygen, and volatile impurities generally. This process will add the benefits obtainable by vacuum melting to the zone-refining benefits. Products having the utmost purity will be obtained under these circumstances.

The zone-refining process of the present invention can be applied to advantage to compacts prepared from various powdered metals. The zone-refining procedure will melt only the interior of such compacts, leaving the exterior surface in the form of a sintered shell. The procedure of Fig. 5 may be applied to such powdered metal compacts in the presence of a high vacuum which will remove gaseous and other volatile impurities through the interstices of the sintered surface walls of such powdered compacts.

While the process of Figs. 1 and 2 is shown as being applied to straight bodies, it may be applied to circular members or hoops as well as to other shapes.

It will be understood that the above description and

We claim as our invention:

1. In the process of zone refining an elongated solid body of a metal without subjecting any of the metal melted during the process to contact with a foreign body, the steps comprising passing and distributing an electrical current through the elongated body at a current density sufficient to cause the highest amperage to flow through a given cross-section of the elongated body to cause only the interior portion at said given cross-section to reach a temperature above the melting point of the metal, thereby producing within the interior of the elongated body at said cross-section a molten zone of a length a small fraction of the entire length of the elongated body, withdrawing heat from the exterior surface of the elongated body to maintain the exterior surface at a temperature below the melting point of the metal whereby the solid exterior surface encloses and confines the molten interior zone, and progressively varying the flow of the electrical current through the elongated body so that the highest amperage electrical current melts succeeding cross-sections adjacent the said given cross-section so that the molten zone moves progressively along the length of the elongated body and thereby effecting zone refining of the interior portion of the elongated body.

2. In the process of zone refining an elongated solid body of a metal without subjecting any of the metal melted during the process to contact with a foreign body, the steps comprising passing and distributing an electrical current through the elongated body at a current density sufficient to cause the highest amperage to flow through a given cross-section of the elongated body to cause only the interior portion at said given cross-section to reach a temperature above the melting point of the metal, thereby producing within the interior of the elongated body at said cross-section a molten zone of a length a small fraction of the entire length of the elongated body, withdrawing heat from the exterior surface of the elongated body to maintain the exterior surface at a temperature below the melting point of the metal whereby the solid exterior surface encloses and confines the molten interior zone, progressively varying the flow of the electrical current through the elongated body so that the highest amperage electrical current melts succeeding cross-sections adjacent the said given cross-section so that the molten zone moves progressively along the length of the elongated body and thereby effecting zone refining of the interior portion of the elongated body, and removing the exterior portions of the elongated body that were not subjected to zone refining to produce a completely zone-refined member.

3. The process of claim 1, wherein the zone-refining steps are repeated at least once, the current density being reduced in the succeeding zone refining pass whereby the molten zone includes a slightly reduced cross-sectional area of the elongated body as compared to the cross-sectional area included in the previous zone-refining pass.

4. In the process of zone refining an elongated solid body of a metal without subjecting any of the metal melted during the process to contact with a foreign body, the steps comprising heating the elongated body to melt a zone at the interior of the elongated body at a given cross-section, the melted zone being of a length a small fraction of the entire length of the elongated body, maintaining the exterior surface of the elongated body at a temperature below the melting point of the metal, whereby the solid exterior surface confines the molten interior zone, and progressively varying the heating of the elongated body so that the interior of the body at a succeeding portion adjacent to one end of the zone is melted, and a part of the molten metal at the opposite end of the zone solidifies, the molten zone thereby moving progressively along the length of the elongated body and thereby effecting zone refining of the interior portion of the elongated body.

5. In the process of zone refining an elongated solid body of a metal without subjecting any of the metal melted during the process to contact with a foreign body, the steps comprising passing an electrical current through a given portion of the elongated body at a current density sufficient to raise the temperature above the melting point of the metal at the interior of the body and adjacent a given cross-section to produce at said cross-section a molten zone of a length a small fraction of the total length of the body, the current flow being lower at all other portions of the elongated body whereby no other portion of the body is molten, the exterior surface of the body surrounding said zone being solid and serving to enclose the molten zone, and progressively varying the flow of electrical current along the elongated body so that portions adjacent to the given portion are subject to sufficient electrical current to cause melting of the interior portions of the elongated body adjacent one end of the melted zone while a part of the molten zone at the opposite end solidifies, the molten zone thereby progressively moving along the length of the elongated body and thereby effecting zone refining of the interior portions of the elongated body.

6. In the process of zone refining an elongated solid body of a metal without subjecting any of the metal melted during the process to contact with a foreign body, the steps comprising passing an electrical current through the elongated body at a current density sufficient to raise the innermost portions of the body to reach a temperature of about the melting point of the metal, the temperature of the exterior surface portions of the body dissipating heat and being substantially below the melting point, surrounding a given cross-section of the elongated body with means for maintaining the temperature substantially higher for a fraction of the length at the cross-section than elsewhere along the length of the body, whereby a substantial portion of the interior of the body at the cross-section is above the melting point thereby producing a molten zone, the exterior surface being solid and confining the molten zone, moving the means for maintaining the temperature progressively along the length of the elongated body so that the molten zone moves progressively therewith, thereby effecting zone refining of the interior portion of the elongated body.

7. The process of claim 6, wherein the means for maintaining the temperature comprises a heat insulating member.

8. The process of claim 6, wherein the means for maintaining the temperature comprises a heating means.

9. The process of claim 6, wherein the means for maintaining the temperature comprises an induction heating coil.

10. In the process of zone refining an elongated solid body of a metal without subjecting any of the metal melted during the process to contact with a foreign body, the steps comprising encircling the elongated body with an induction heating coil, energizing the induction heating coil to heat a given cross-section of the elongated body to a temperature such that only the interior portion of the body at said given cross-section is above the melting point of the metal and the exterior surface portion of the elongated member is solid whereby there is produced at said cross-section a molten zone of metal of a length a small fraction of the total length of the elongated body, the molten zone being confined by the solid exterior surface, and progressively moving the induction heating coil relative to the elongated body so that additional metal is melted at the interior of the elongated body adjacent one end of the molten zone and a part of the molten metal at the opposite end of the zone solidifies so that the molten zone moves progressively along the length of the elongated body, thereby effecting zone refining of the interior portion of the body.

11. In the process of zone refining an elongated solid body of a metal without subjecting the metal melted during the process to contact with a foreign body, the elongated body having a cross-section such that the portion not included within a circle drawn from the geometrical axis of symmetry of the cross-section to the nearest exterior surface forms a plurality of ribs, the steps comprising encircling the elongated body with an induction heating coil, energizing the induction heating coil to heat a given cross-section of the elongated body to a temperature such that only the interior portion extending to and including said circle is above the melting point of the metal while the ribs are solid and serve as a confining cage for said molten metal, to retain said molten metal in place, whereby there is produced at said cross-section a molten zone of metal of a length a small fraction of the total length of the elongated body, and progressively moving the induction heating coil relative to the elongated body so that additional metal is melted at the interior of the elongated body adjacent one end of the molten zone and a part of the molten metal at the opposite end of the zone solidifies so that the molten zone moves progressively along the length of the elongated body, thereby effecting zone refining of the interior portion of the body.

12. The process of claim 11, wherein the elongated body is subjected to a vacuum so that the molten zone is degassed during the zone-refining process.

13. The process of claim 11, wherein the zone refining steps are repeated at least once, the induction coil being energized less in the succeeding zone-refining pass, whereby the molten zone includes a slightly reduced cross-sectional area of the elongated body as compared to the cross-sectional area of the molten zone in the preceding refining pass.

References Cited in the file of this patent

"Journal of Metals," vol. 4, pages 747–754, 1952.